April 16, 1929.  H. M. PERRY  1,709,737
HAND TRUCK ATTACHMENT
Filed July 6, 1928
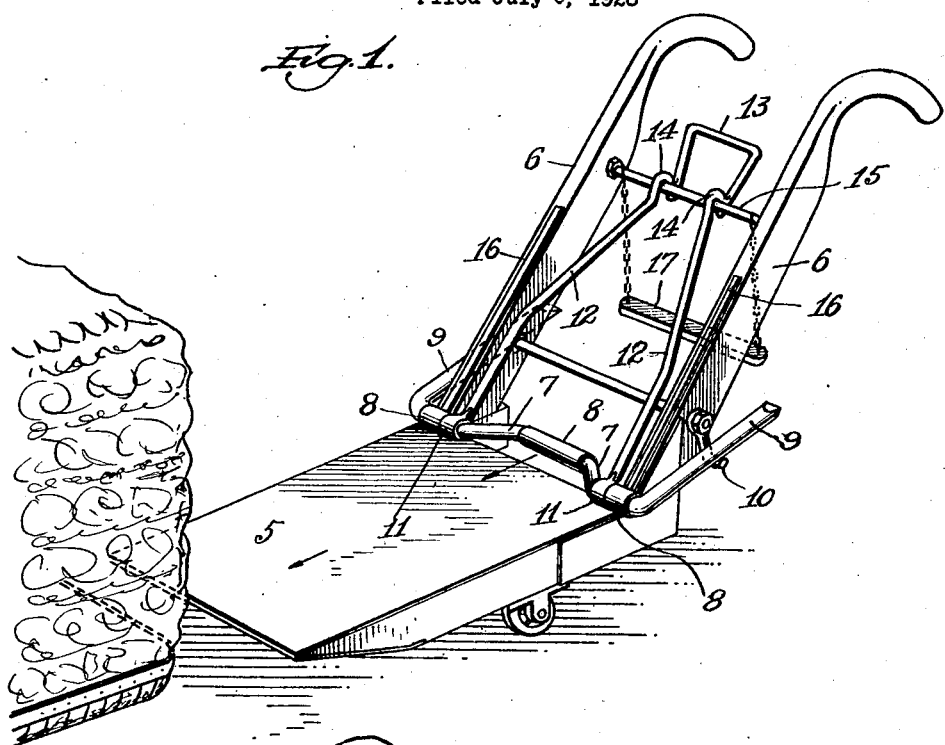
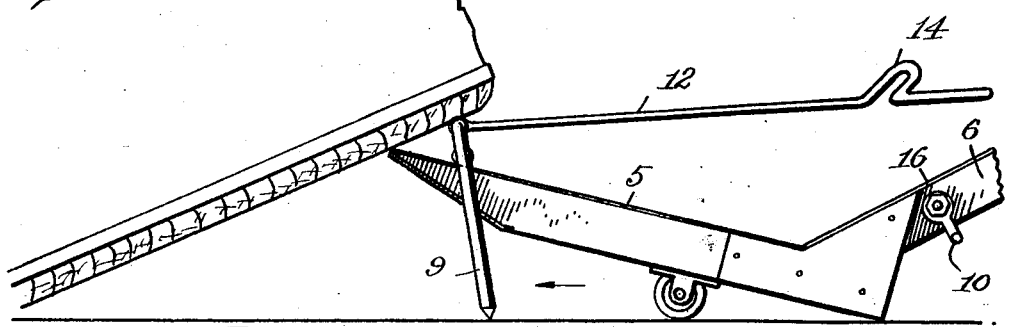
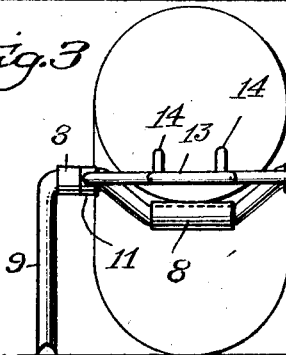
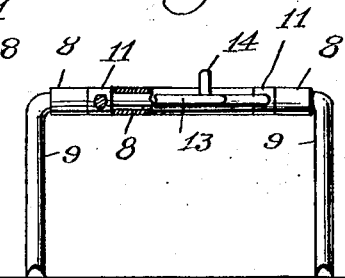
Inventor
H. M. PERRY,
by Davis & Davis,
Attorneys.

Patented Apr. 16, 1929.

1,709,737

UNITED STATES PATENT OFFICE.

HOWARD M. PERRY, OF CLARKSVILLE, TENNESSEE.

HAND-TRUCK ATTACHMENT.

Application filed July 6, 1928. Serial No. 290,743.

This invention has relation to that type of hand-truck attachment covered by my former Patent No. 1,636,574, dated July 19, 1927. The main object of the present invention is to simplify the device and at the same time adapt it for use on a large number of trucks now in use, as more fully hereinafter set forth.

In the drawing—

Fig. 1 is a perspective view of a hand-truck carrying my attachment;

Fig. 2 is a side elevation showing the device in operation;

Fig. 3 is an end elevation showing the prop in position under a cylindrical load;

Fig. 4 is a side elevation of the prop which is preferably used for flat-bottomed loads.

The hand-truck illustrated is a well-known type, having a more or less sharp nose adapted to be shoved under a bale, basket, box, barrel or other load to be placed upon the truck platform 5. A pair of handles 6 extend up rearwardly from the platform in the usual manner. My device consists of a prop-bar 7 adapted to rest upon the truck platform at the junction of the same with the handles, this bar being provided with three roller-sleeves 8 adapted to facilitate the movement of the bar back and forth on the surface of the platform 5. To each end of the prop-bar 7 is connected a prop-leg 9 which, when the device is not in use, as shown in Fig. 1, may rest upon a pair of hanger-lugs 10 attached to the outer sides of the handles.

Pivotally attached to the bar 7, at the points 11, is a handle consisting of a pair of rods 12 connected at their rear ends by a transverse grasping-bar 13 and provided at a point intermediate their ends with upward bends or loops 14 adapted to hook over the usual cross-bar 15 connecting the handles, to thereby hold the device in out-of-use position, as shown in Fig. 1, the loops 14 being inclined backwardly slightly in order to prevent the attachment being jolted out of position while manipulating the truck.

In utilizing this attachment, the operator first shoves the sharp nose of the truck under the basket, bale or other load and then tilts the load upwardly, as shown in Fig. 2, by bearing down on the rear ends of the handles; then, while holding the load in this tilted position, the operator lifts the handle off the cross-bar 15 and pushes it forwardly so as to cause the rollers 8 to roll along the then upwardly-sloping surface of the platform toward the bale. As the device is pushed along up the platform surface, the legs drop off the hangers 10 and drag along the floor, and, when the bar 7 has been pushed against the bottom of the load, the legs 9 will be in a position to sustain the load in tilted position, as shown in Fig. 2, when the truck may be removed by being pulled backwardly away from the load or the nose of the truck may be lowered and pushed forward into loading position. The lower ends of the legs 9 are sharpened in order to permit them to take secure footing on the floor and thus prop up the load. The bale or other load may then be deposited upon the platform 5 by pushing the truck forwardly under the bale. When the truck is thus shoved under the bale to load it upon the platform, the attachment may be readily pulled from under the load, up the incline of the truck-handles, until legs 9 clear hangers 10, after which the attachment is pushed forward into original carrying position with loops 14 engaging cross-member 15 and hangers 10 supporting the legs, thus leaving the load free on the platform of the truck. In this way, a heavy bale or box or other load may be loaded upon the platform of the truck with the aid of but a single operator.

To adapt the device for cylindrical loads, such as barrels, I bow the bar 7 to form a sort of saddle, as shown in Figs. 1 and 3, but for flat bottomed loads I prefer using a straight bar, as shown in Fig. 4. To prevent undue wear on the front edges of the handles, I provide the same with metal wearing-strips 16; and, to assist the operator in tilting heavy loads, I provide the rear cross-bar 15 of the handle with a depending stirrup 17, into which the operator may place one of his feet for the purpose of assisting his arms in tilting the handles downwardly. I show this stirrup made of a cross-bar with depending edges, but it will be understood that it may be constructed in any other suitable manner.

What I claim as new is:

1. The combination with a tiltable truck having a nose portion adapted to be shoved under a load, of an attachment consisting of a prop-bar adapted to move along the surface of the truck platform and carrying a prop-leg at each end, and a rearwardly-extending handle connected to said bar for sliding the same forwardly on the platform surface to place the prop under the load after the same is tilted by the truck and to pull the attachment from under the load.

2. The combination with a tiltable truck having a nose portion adapted to be shoved under a load, of an attachment consisting of a prop-bar adapted to move along the surface of the truck platform and carrying a prop-leg at each end, and a rearwardly-extending handle connected to said bar for sliding the same forwardly on the platform surface to place the prop under the load after the same is tilted by the truck, said rearwardly-extending handle being pivotally connected to said cross-bar.

3. The combination with a tiltable truck having a nose portion adapted to be shoved under a load, of an attachment consisting of a prop-bar adapted to move along the surface of the truck platform and carrying a prop-leg at each end, and a rearwardly-extending handle connected to said bar for sliding the same forwardly on the platform surface to place the prop under the load after the same is tilted by the truck, said rearwardly-extending handle being pivotally connected to said cross-bar and said prop-bar being provided with rollers adapted to roll along the surface of the truck platform.

4. The combination with a tiltable truck having a nose portion adapted to be shoved under a load, of an attachment consisting of a prop-bar adapted to move along the surface of the truck platform and carrying a prop-leg at each end, and a rearwardly-extending handle connected to said bar for sliding the same forwardly on the platform surface to place the prop under the load after the same is tilted by the truck, a hanger being provided on one or both of the handles for holding the prop-legs off the floor when the device is not in use as a prop.

5. The combination with a tiltable truck having a nose portion adapted to be shoved under a load, of an attachment consisting of a prop-bar adapted to move along the surface of the truck platform and carrying a prop-leg at each end, and a rearwardly-extending handle connected to said bar for sliding the same forwardly on the platform surface to place the prop under the load after the same is tilted by the truck, a depending stirrup being provided at the rear ends of the handles to enable the operator by foot pressure to assist in tilting the truck.

6. The combination with a tiltable truck having a handle-structure and a nose portion adapted to be shoved under a load, of an attachment consisting of a prop-bar adapted to move along the surface of the truck platform and carrying a prop-leg at each end, and a rearwardly-extending handle connected to said bar for sliding the same forwardly on the platform surface to place the prop under the load after the same is tilted by the tilting of the truck, said rearwardly-extending handle being pivotally connected to said prop-bar, the handle being provided at its rear end with means for attaching it to the truck-handle structure, to thereby hold the attachment in place on the truck when it is not in use as a prop.

7. The combination with a tiltable truck having a handle-structure and a nose portion adapted to be shoved under a load, of an attachment consisting of a prop-bar adapted to move along the surface of the truck platform and carrying a prop-leg at each end, and a rearwardly-extending handle connected to said bar for sliding the same forwardly on the platform surface to place the prop under the load after the same is tilted by the tilting of the truck, said rearwardly-extending handle being pivotally connected to said prop-bar, the handle being provided with a pair of rearwardly-inclined notches adapted to engage over part of said handle structure, to thereby hold the attachment in place on the truck when not in use as a prop.

8. The combination with a tiltable truck having a nose portion adapted to be shoved under a load and also a pair of truck-handles inclining upwardly and backwardly from the truck platform, of an attachment consisting of a prop-bar adapted to lie upon and move along the surface of the truck platform and carrying a prop-leg at each end adapted to depend at the side of the truck, and a rearwardly-extending handle connected to said bar for sliding the same forwardly on the platform surface to place the prop under the load after the same is tilted by the truck and to pull the attachment from under the load and upwardly onto the aforesaid truck-handles, means being provided to hold said attachment in this latter position.

In testimony whereof I hereunto affix my signature.

HOWARD M. PERRY.